US009543096B2

(12) United States Patent
Bieringer et al.

(10) Patent No.: US 9,543,096 B2
(45) Date of Patent: Jan. 10, 2017

(54) ON-LOAD TAP CHANGER

(71) Applicants: Alfred Bieringer, Geiselhoering (DE); Christian Hammer, Regensburg (DE); Martin Pankofer, Plattling (DE); Rolf Strempel, Regensburg (DE); Andreas Stocker, Neutraubling (DE)

(72) Inventors: Alfred Bieringer, Geiselhoering (DE); Christian Hammer, Regensburg (DE); Martin Pankofer, Plattling (DE); Rolf Strempel, Regensburg (DE); Andreas Stocker, Neutraubling (DE)

(73) Assignee: MASCHINENFABRIK REINHAUSEN GMBH, Regensburg (DE)

( * ) Notice: Subject to any disclaimer, the term of this patent is extended or adjusted under 35 U.S.C. 154(b) by 205 days.

(21) Appl. No.: 14/379,875

(22) PCT Filed: Mar. 25, 2013

(86) PCT No.: PCT/EP2013/056232
§ 371 (c)(1),
(2) Date: Aug. 20, 2014

(87) PCT Pub. No.: WO2013/156262
PCT Pub. Date: Oct. 24, 2013

(65) Prior Publication Data
US 2015/0027989 A1 Jan. 29, 2015

(30) Foreign Application Priority Data
Apr. 20, 2012 (DE) .................. 10 2012 103 489

(51) Int. Cl.
*H01H 33/666* (2006.01)
*H01H 9/00* (2006.01)
(Continued)

(52) U.S. Cl.
CPC .......... *H01H 33/6661* (2013.01); *H01F 29/04* (2013.01); *H01H 9/0027* (2013.01); *H01H 9/0038* (2013.01); *H02P 13/06* (2013.01)

(58) Field of Classification Search
CPC ......... H01F 29/04; H01H 33/666; H01H 3/38; H01H 81/00; H01H 33/34
(Continued)

(56) References Cited

U.S. PATENT DOCUMENTS 4,996,397 A * 2/1991 Kuhn ................... H01H 3/3042
200/568
5,523,674 A 6/1996 Dohnal
(Continued)

FOREIGN PATENT DOCUMENTS

DE 4237165 * 3/1994 .......... H01H 9/0016
DE 19847745 B 1/2000
(Continued)

*Primary Examiner* — Edwin A. Leon
*Assistant Examiner* — Iman Malakooti
(74) *Attorney, Agent, or Firm* — Andrew Wilford

(57) ABSTRACT

The invention relates to an on-load tap changer for switching among different winding taps of a step transformer without interruption according to the preamble of the first patent claim. The general inventive concept lies in actuating both the selector contact unit and the switching means for uninterrupted load switching by means of a common motor drive without an energy store being connected therebetween.

19 Claims, 11 Drawing Sheets

(51) Int. Cl.
*H01F 29/04* (2006.01)
*H02P 13/06* (2006.01)

(58) Field of Classification Search
USPC .................................................. 218/140, 154
See application file for complete search history.

(56) References Cited

U.S. PATENT DOCUMENTS

| | | | |
|---|---|---|---|
| 7,145,760 | B2 | 12/2006 | Stenestam |
| 7,463,010 | B2 * | 12/2008 | Dohnal ................ H01H 9/0027 318/563 |
| 8,648,587 | B2 | 2/2014 | Brueckl |
| 2012/0139510 | A1 | 6/2012 | Wrede |

FOREIGN PATENT DOCUMENTS

| | | | |
|---|---|---|---|
| DE | 19855860 B | 2/2000 | |
| GB | 2614794 A | 8/1979 | |
| JP | S59204224 B | 11/1984 | |

* cited by examiner

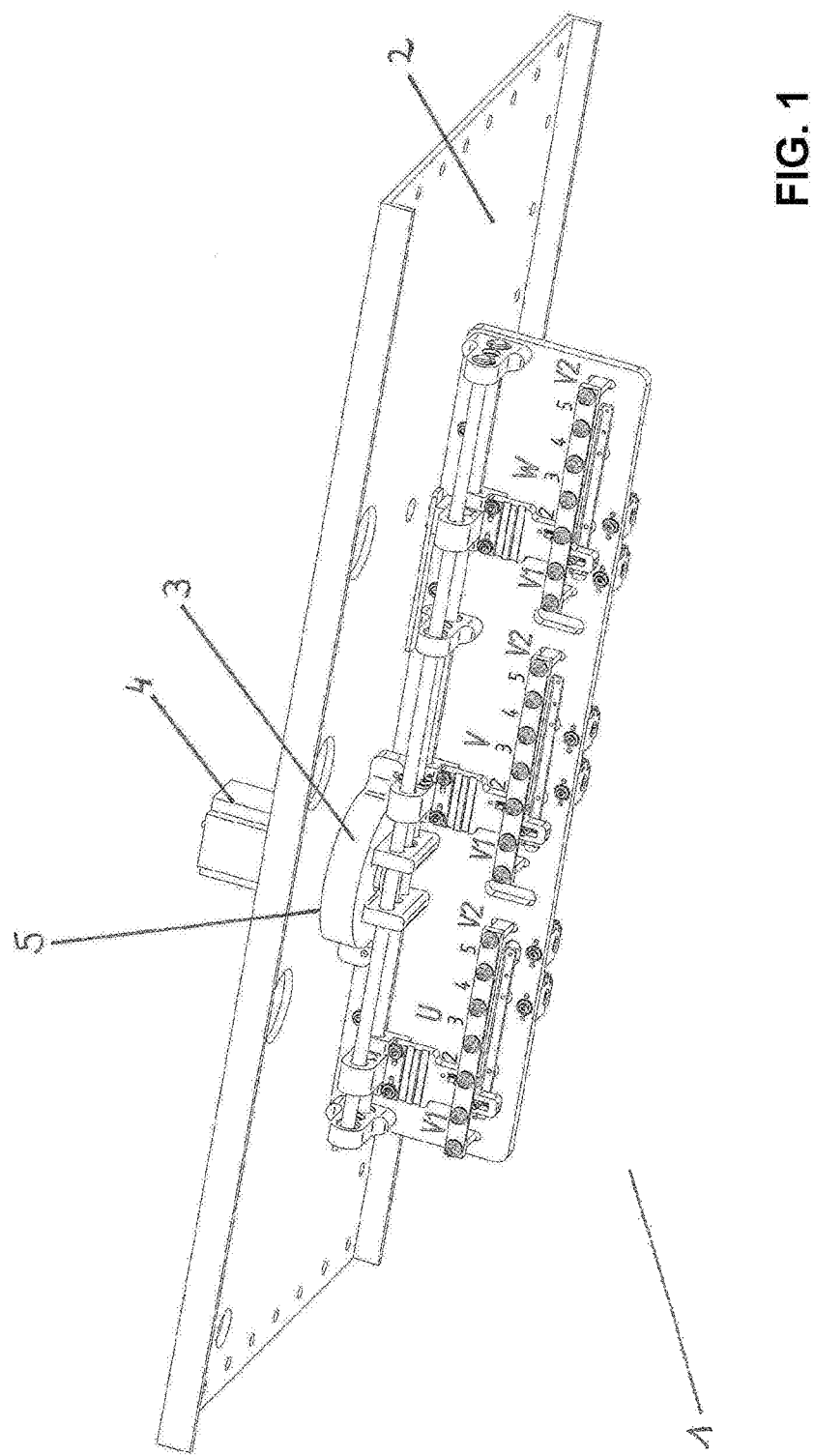

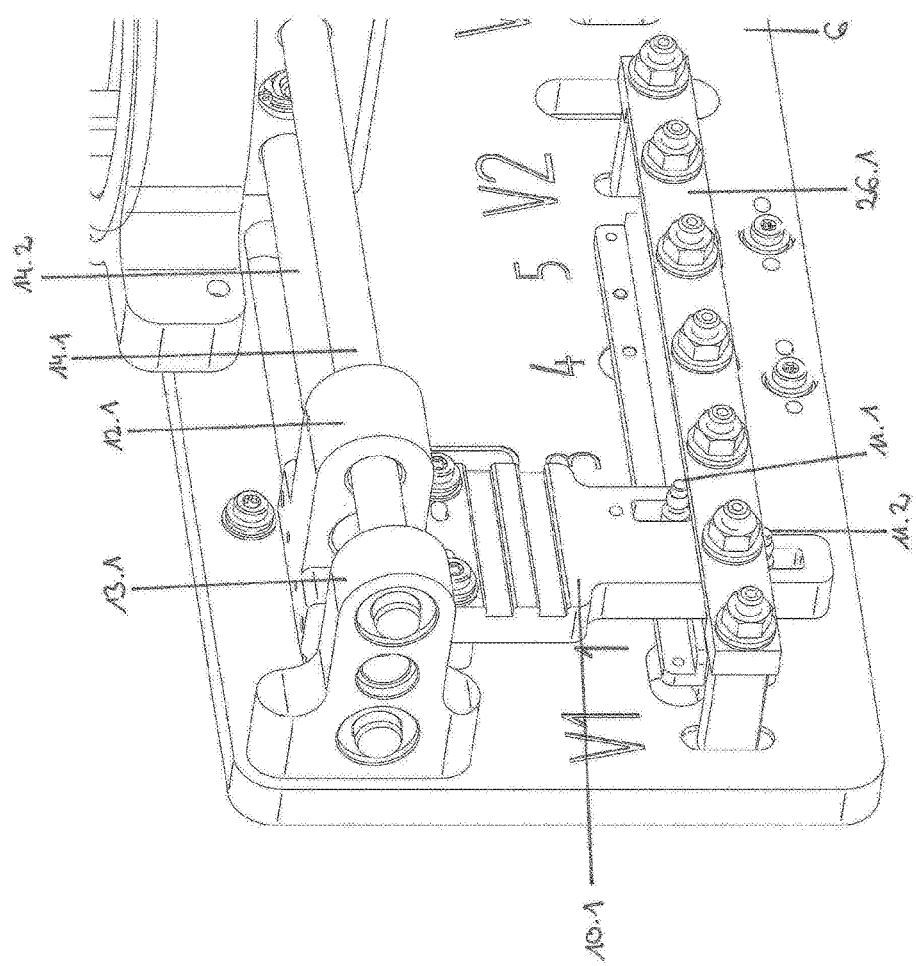

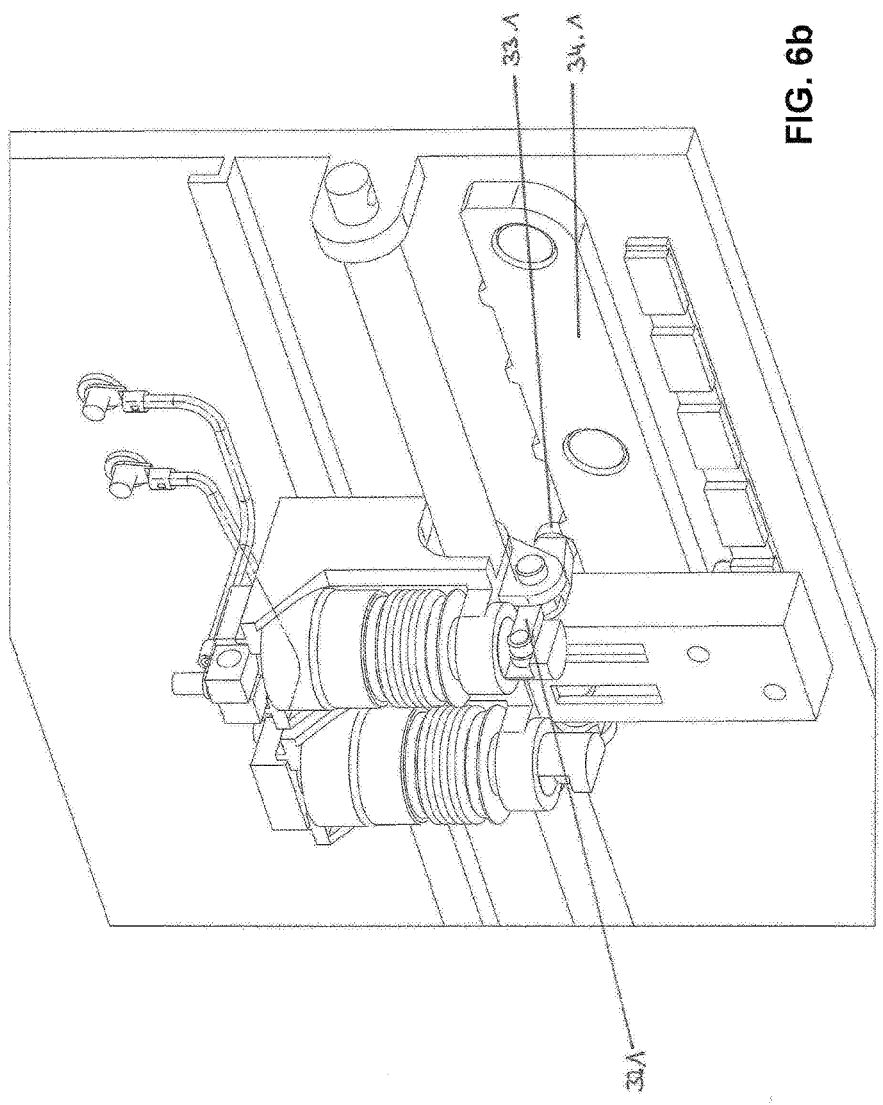

ON-LOAD TAP CHANGER

CROSS REFERENCE TO RELATED APPLICATIONS

This application is the US-national stage of PCT application PCT/EP2013/056232 filed 25 Mar. 2013 and claiming the priority of German patent application 102012103489.3 itself filed 20 Apr. 2012.

The present invention relates to an on-load tap changer for uninterrupted switching between different winding taps of a tapped transformer in accordance with the preamble of the first claim.

On-load tap changers have been in use worldwide on a large scale for many years for uninterrupted switching between different winding taps of tapped transformers. So-called reactor switches, which are particularly widespread in North America, have a switch-over reactance which enables a slow, continuous switching. On-load tap changers according to the resistance fast switching principle usually consist of a selector for power-free selection of the respective winding tap of the tapped transformer which is to be switched over to and a load changeover switch for the actual changing over from the previous to the new, preselected winding tap. The load changeover switch for that purpose usually comprises switch contacts and resistance contacts. The switch contacts in that case serve for direct connection of the respective winding tap with the load diverter and the resistance contacts for temporary connection, i.e. bridging-over by one or more switching-over resistances. However, developments in recent years have led away from load changeover switches with mechanical switching contacts in insulating oil. Instead, vacuum interrupters are increasingly employed as switching elements.

An on-load tap changer of that kind with vacuum interrupters is disclosed in, for example, DE 10 2009 043 171 [US 2003/0139510]. Here, a load changeover switch carries a drive shaft, which is drivable by a force-storing device, with at least one cam disc. The cam disc has a plurality of cams, wherein two cams arranged at the cam disc at the end have a profile, which departs from the circular shape, in the form of lobes at which a respective roller, which is connected with a vacuum interrupter by way of a rocker arm and which scans the profiled contour of the respective cam, is guided with maintained contact.

In one specific category of on-load tap changer, i.e. so-called load selectors, the described means for selection of a new winding tap and the means for the actual load changeover are constructionally combined and actuated in common. Tap changers according to the principle of resistance fast switching for uninterrupted switching from one winding tap at the tapped transformer to another are usually constructed so that the respective fixed tap contacts electrically connected with the output lines of the tap windings are arranged in one or more horizontal planes circularly at an insulating-material frame or cylinder and are connectable by rotatable contact bridges actuated by concentric drive shafts. In the case of load selectors in which the tap selection and the actual load switching are combined, actuation of the contact bridges in that case takes place abruptly after triggering of a force-storing device, usually a spring-force store, drawn up by the drive shaft of the switch.

In departure from these usual constructions, a tap changer with linear contact actuation is described in DE 42 37 165 [U.S. Pat. No. 5,523,674], wherein the fixed tap contacts extend along a track in the interior of the switch and are connectable by a displaceable switching mechanism, which in turn is driven by the drive shaft. The vertically displaceable switching mechanism in that case consists of a draw-up carriage which is continuously drivable by the drive shaft and which preselects the new fixed tap contact, and a drive output part, which can be drawn up by the draw-up carriage by a force-storing device and which after triggering abruptly runs after the draw-up carriage and in that case executes the actual load changeover from the previous tap of the tapped winding to the preselected new tap. The switch elements required for that purpose are a component of the output drive part.

A further on-load tap changer, which is attributable to the applicant, with linearly arranged selector contacts has become known from DE 198 47 745. Disposed above the selector contacts, thus locally separated, are the stationary vacuum interrupters, which are associated with the respective selector contacts of each phase, for the actual, abrupt load changeover. A spring force-storing device is necessary for actuation of this on-load tap changer, which store actuates the selector contacts during its drawing up movement as well as the vacuum switching elements by its abrupt drive output movement.

Regardless of the constructional form of the on-load tap changer, thus with rotating or linearly movable contact system, a spring-force-storing device for abrupt switching-over by the contact system is needed in on-load tap changers known from the prior art. Force-storing devices known from the prior art have to be drawn up, i.e. stressed, at the start of each actuation of the on-load tap changer by a drive shaft. The known force-storing devices essentially consist of a draw-up carriage and a jump carriage, between which force-storage springs as force-storing devices are arranged. Force-storing devices of that kind can be inferred from, for example, DE 198 55 860 and DE 28 06 282 [GB 2,614,794].

An initial slow rotation of the drive shaft is employed so as to translationally draw up a draw-up carriage in order to subsequently transfer the again straight-line movement of the jump carriage into a rotational main movement of the drive output shaft and into an actual contact actuation connected therewith. This complicated conversion of rotation into a straight-line movement and back again into rotation requires a large amount of space for the force-storing device construction within the on-load tap changer and in addition a multiplicity of complex individual subassemblies.

The object of the present invention is therefore to indicate an on-load tap changer which dispenses with the complicated construction of a force-storing device and thus offers a significantly simplified form of construction with, at the same time, increased operational reliability.

This object is fulfilled by an on-load tap changer for uninterrupted switching between different winding taps of a tapped transformer with the features of the first claim. The subclaims in that case relate to particularly advantageous developments of the invention.

The general inventive idea consists in actuating not only the selector contact unit, but also the switching means for the uninterrupted load changeover by a common motor drive without interposition of a force-storing device.

According to a preferred form of embodiment this is achieved in that rotation produced by a motor drive is transferred by a transmission module to a threaded spindle disposed in engagement with a spindle nut, which is provided at a center slide carriage, so that a longitudinal displacement of the middle slide carriage along guide rods can thereby be produced, whereas the remaining slide carriages are disposed in operative connection with the middle slide carriage by way of a similarly longitudinal displaceable guide link, which is arranged at the second side of a support plate and which is mechanically coupled with the middle slide carriage, so that the remaining slide carriages are in turn mechanically coupled with the middle slide carriage by way of the guide link in such a manner that not only the selector contact unit, but also the switching means for the uninterrupted load switching-over are thereby simultaneously actuatable. Thus, actuation of the vacuum interrupters is directly derived from the linear movement of the selector contact unit.

According to a further preferred form of embodiment of the invention the on-load tap changer comprises a transmission module, which is fastened to the underside of the transformer cover and which co-operates with the motor drive arranged at the opposite outer side of the transformer cover. The transmission module has, for that purpose, a flange-like sealing module, which is arranged directly at the underside of the transformer cover and which is detachably connected, in particular screw-connected, with the motor drive. In addition, the entire load changeover switch is fastened to the transmission module. The transmission module thus has not only the task of mounting the on-load tap changer, but also the task of sealing relative to the outer side of the transformer by the sealing module. Twistings of the transformer cover during transport of the transformer are thus not transmitted to the on-load tap changer. In addition, a connecting flange with milled-over sealing surface at the transformer cover can thus be eliminated. Beyond that, this form of proposed fastening offers to the transformer manufacturer simple mounting of the on-load tap changer within the transformer vessel.

According to a further preferred form of embodiment of the invention a support plate of a dielectric material, particularly a plastics material, is provided, at which the selector contact unit is arranged on a first side and the switching means for uninterrupted switching-over on a second side in such a manner that the support plate produces the spacing from ground necessary for the on-load tap changer.

According to yet a further form of embodiment of the invention the at least one selector contact unit during switching-over is moved along two substantially parallel arranged guide rods which ensure linear guidance of the at least one selector contact unit and which are mounted by a plurality of cross members arranged at the support plate. A selector contact unit in that case comprises at least one respective slide carriage as well as a contact support for receiving the movable selector contacts which co-operate with the fixed selector contacts.

According to yet a further form of embodiment of the invention the movable selector contacts are respectively received in a contact support and co-operate with fixed selector contacts, which are arranged at the support plate, in such a manner that the individual fixed selector contacts are connectable by a longitudinal displacement of the movable selector contacts inclusive of the slide carriages, thus the selector contact unit, along the guide rod. By virtue of the movement of the selector contact unit to and/or fro the individual fixed selector contacts are connected and thus run through the regulating range of the on-load tap changer. The plurality of cross members, on which the guide rods are mounted, in particularly simple manner forms a mechanical abutment for the movable selector contacts displaceable longitudinally, so that the regulating range is thereby also mechanically limited.

According to yet a further preferred form of embodiment the switching means for the uninterrupted switching are directly arranged on the respective slide carriage of the corresponding selector contact unit. In this form of embodiment as well the switching means for the uninterrupted switching, as also the selector contact unit, are operated by a common motor drive without interposition of a force-storing device, in that the motor drive drives, by a diverter transmission, a central threaded spindle which in turn again converts the rotation into a longitudinal displacement of the slide carriages in such a manner that as a result not only the movable selector contacts, but also the switching means—which are arranged at the selector contact unit—for the uninterrupted switching are actuatable.

According yet a further preferred form of embodiment of the invention not only a threaded spindle, which for its part is operatively connected with the selector contact unit, but also a camshaft, by means of which the switching means for the uninterrupted switching are actuatable, are driven by the motor drive. This makes possible in particularly advantageous manner a simple independent actuation of the selector contact unit by the switching means for the uninterrupted switching.

The invention and the advantages thereof are described in more detail in the following with reference to the accompanying drawings, in which:

FIG. 1 shows a schematic perspective view of one form of embodiment of the on-load tap changer according to the invention;

FIG. 4b shows yet a further detail view of the selector contact unit of an on-load tap changer according to the invention;

FIG. 6b shows a detail view of the side perspective view according to FIG. 6a;

FIG. 7b shows a second side perspective view of the further form of embodiment according to FIG. 7a.

Figure 2A:
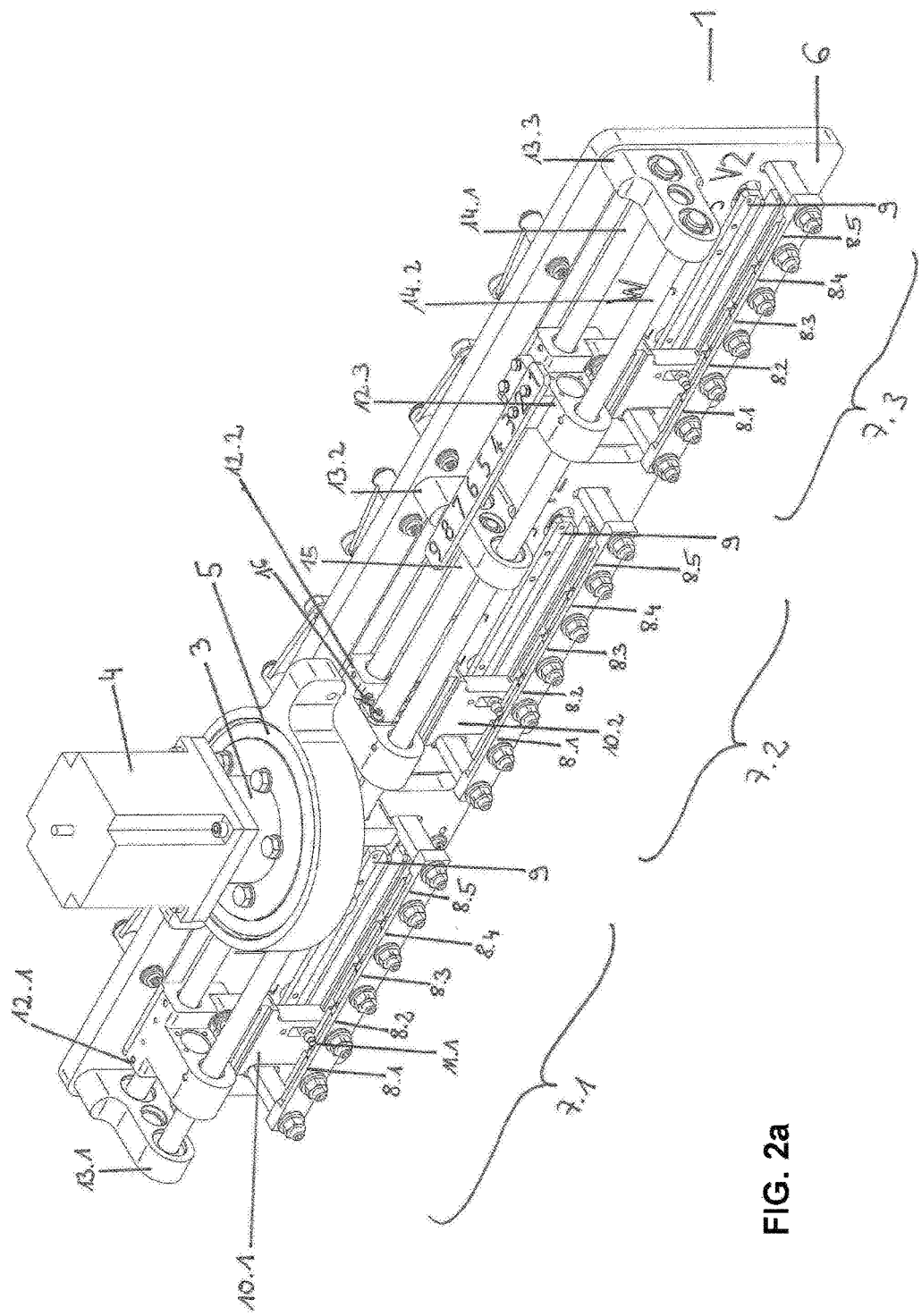
FIG. 2 shows a first side perspective view of the on-load tap changer according to FIG. 1, at which the selector contacts are arranged.
FIG. 2b shows a second side perspective view of the on-load tap changer according to FIG. 1, at which the switching means for the uninterrupted load changeover are arranged.

An on-load tap changer 1 according to the invention, which is arranged directly below a transformer cover 2 of a tapped transformer (not illustrated in more detail), is shown in FIG. 1 in a perspective view. A more precise description of the components of the on-load tap changer 1 and the function thereof can be inferred from the description of the FIGS. further below. A tapped transformer of that kind, which is well-known from the prior art, comprises a transformer vessel, which is filled with insulating oil and in which at least one winding is arranged at an iron yoke. This winding is divided into a main winding and a regulating winding, at which a plurality of winding taps forming the regulating range is provided. In addition, the on-load tap changer comprises a transmission module 3, which is attached to the underside of the transformer cover 2 and which co-operates with a motor drive 4 arranged at the opposite, outer side of the transformer cover 2. The motor drive 4 can in that case be constructed as, for example, a proprietary step motor. The transmission module 3 comprises a flange-like sealing module 5, which is arranged directly at the underside of the transformer cover 2 and detachably connected, in particular screw-connected, with the motor drive 4. The entire on-load tap changer 1 is thus fastened to the transmission module 3. The transmission module 3 fulfils not only the task of mounting the on-load tap changer 1, but also the task of hermetically sealing relative to the outer side of the transformer by the sealing module 5. Consequentially, twistings of the transformer cover 2 during transport of the transformer are not transmitted to the on-load tap changer 1.

Figure 2B:
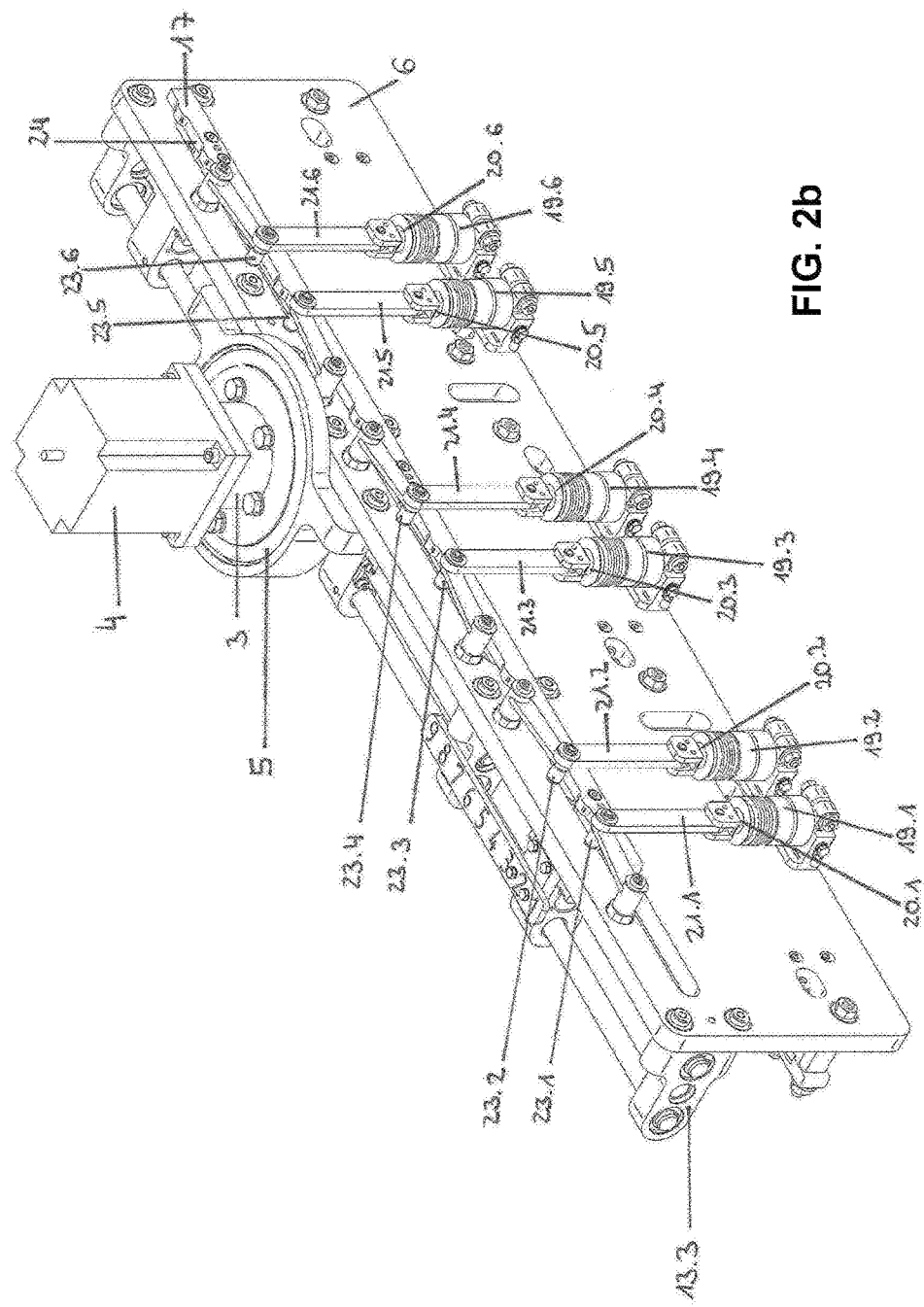

FIGS. 2a and 2b show the on-load tap changer 1 according to the invention in two different perspective side views. Mechanically connected with the transmission module 3 is a support plate 6 of dielectric material, to which the individual subassemblies of the on-load tap changer 1 are fastenable. The support plate 6 is in that case made from electrically insulating material and constructed for the purpose of receiving all significant components of the on-load tap changer 1. In that case, FIG. 2a shows the first side of the on-load tap changer 1, at which the subassemblies of the at least selector contact unit 7.1, 7.2 and 7.3 are fastened to the support plate 6. In the illustration of FIG. 2a there are, for example, three selector contact units 7.1, 7.2 and 7.3; each selector contact unit 7.1, 7.2 and 7.3 is in that case connected with a separate phase, thus winding, of the tapped transformer. Each selector contact unit 7.1 . . . 7.3 comprises a respective plurality of connectable fixed selector contacts 8.1 . . . 8.5, which are electrically connected with the winding taps of the regulating winding of the tapped transformer, a contact rail 9 connected with a load diverter LA, and a contact support 10.1 . . . 10.3 with two respective resiliently mounted, movable selector contacts 11.1, 11.2. Regardless of the principle of switching, thus according to the reactor switching principle or resistance fast switching principle, in that case middle settings—in which one movable selector contact, for example the movable selector contact 11.1, is connected with the first fixed selector contact, for example the fixed selector contact 8.1, and the other movable selector contact, for example the movable selector contact 11.2, is connected with the second fixed selector contact, for example the fixed selector contact 8.2, adjacent to the first fixed selector contact—are permissible as stationary operational settings of the on-load tap changer 1. Thus, according to the reactor switching principle nine stationary operational settings are possible with the, here, five illustrated fixed selector contacts 8.1 . . . 8.5, whereas in the case of an on-load tap changer 1 according to the resistance fast switching principle, in which no middle settings are permissible, there are only five stationary operational settings. The contact support 10.1 . . . 10.3 of each phase is then mechanically fixed to a slide carriage 12.1 . . . 12.3 and forms together therewith a constructional unit. The slide carriages 12.1 . . . 12.3 are received at two parallel arranged guide rods 14.1 and 14.2, which are fixed to the support plate 6 by a plurality of cross members 13.1 . . . 13.3, in such a manner that the individual fixed selector contacts 8.1 . . . 8.5 are connectable by a longitudinal displacement of the movable contacts 11.1 . . . 11.3 inclusive of slide carriages 12.1 . . . 12.3 along the guide rods 14.1 and 14.2. For this purpose, rotation produced by the motor drive 4 is transmitted by the transmission module 3 to a threaded spindle 15 disposed in engagement with a spindle nut 16, which is provided at the middle slide carriage 12.2, so that a longitudinal displacement of the middle slide carriage 12.2 along the guide rods 14.1 and 14.2 can thus be produced. The remaining slide carriages 12.1 and 12.3 are in operative connection with the middle slide carriage 12.2 by way of a similarly longitudinally displaceable guide link 17, which is arranged at the second side of the support plate 6, in that the slide carriages 12.1 and 12.3 are mechanically coupled with the slide carriage 12.2 by way of the guide link 17. A more precise description of this mechanically constrained guidance of the slide carriages 12.1 and 12.3 by the slide carriage 12.2 can be inferred from the FIG. description further below with respect to FIG. 3. The plurality of cross members 13.1 . . . 13.3, at which the guide rods 14.1 and 14.2 are retained, additionally forms a mechanical abutment for the movable contacts 10.1 . . . 10.3, which are longitudinally displaceable inclusive of slide carriages 12.1 . . . 12.3, so that the regulating range of the on-load tap changer 1 is thus also mechanically limited.

FIG. 2b in that case shows the second side of the support plate 6, at which the switching means for uninterrupted switching are arranged. In the embodiment of FIG. 2b the switching means for the uninterrupted switching are vacuum interrupters 19.1 . . . 19.6, wherein in each instance two respective vacuum interrupters 19.1 and 19.2 or 19.3 and 19.4 or 19.5 and 19.6 are associated with each phase of the on-load tap changer 1 and co-operate with a corresponding selector contact unit 7.1 . . . 7.3. The vacuum interrupters 19.1 . . . 19.6 are switching means, which are known from the prior art, with a movable switch contact 20.1 . . . 20.6 as well as a fixed contact 18.1 . . . 18.6, which is not illustrated in more detail. Each of the vacuum interrupters 19.1 . . . 19.6 in that regard comprises a movable switch contact 20.1 . . . 20.6 which is arranged at the second side of the support plate 6 to be respectively pivotably connected with a coupling element 21.1 . . . 21.6 and a control lever 22.1 . . . 22.6. Provided at the pivotable connection between the corresponding coupling element 21.1 . . . 21.6 and the control lever 22.1 . . . 22.6 is, on the side facing the support plate 6, a respective rotatably mounted roller 23.1 . . . 23.6 which rolls along the upper side 24 of the guide link 17 under partially maintained contact. The upper side 24 of the guide link 17 has in that case a profiling in the form of lobes so that the vacuum interrupters 19.1 . . . 19.6 can be connected, i.e. opened or closed, by a longitudinal displacement of the guide link 17 in dependence on the profiling of the upper side 24 of the guide link 17.

Figure 3:
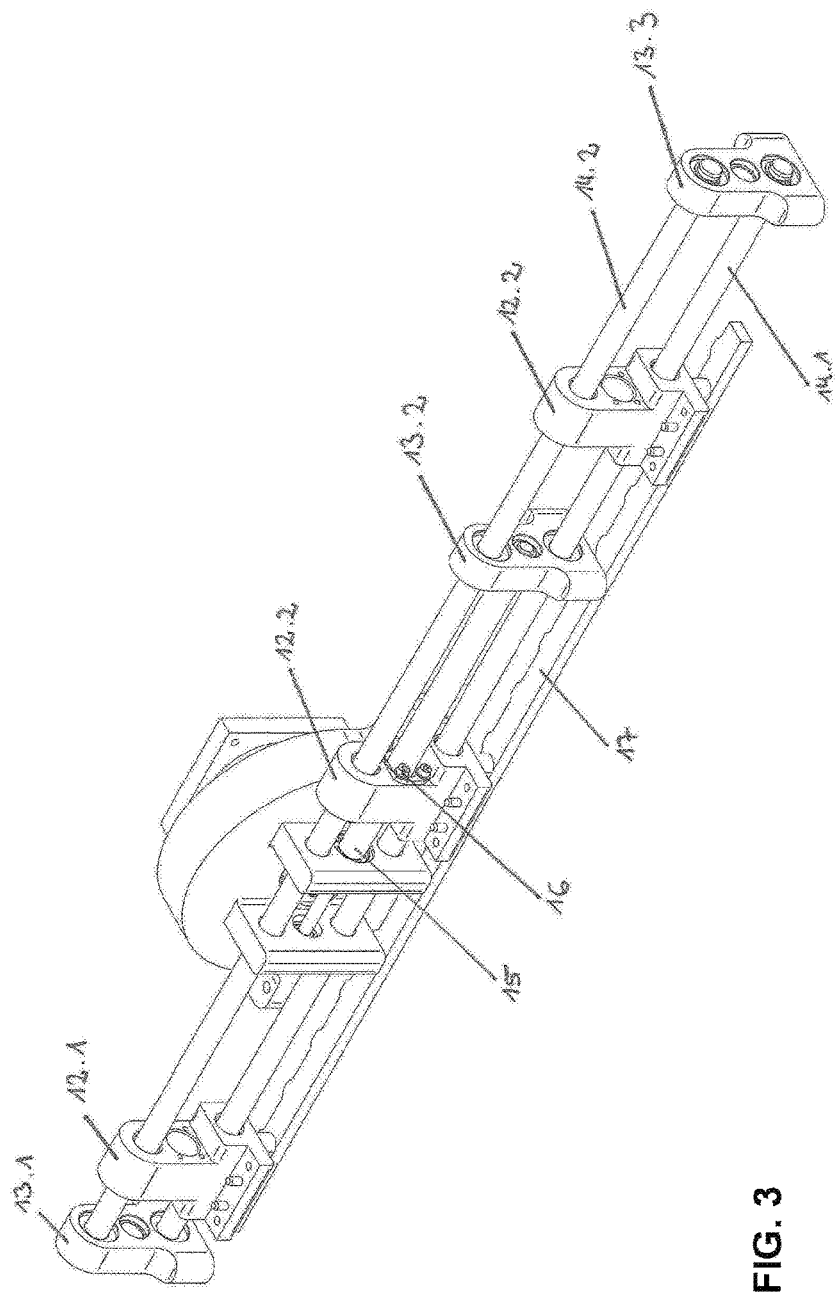
FIG. 3 shows a detail view of the guide rods of an on-load tap changer according to the invention.

FIG. 3 shows a simplified detail view of the mechanical coupling of the slide carriages 12.1 . . . 12.3 with the guide link 17. The transmission module 3 is shown, which transmits rotation by way of gears (not illustrated here in more detail) to the threaded spindle 15, which in turn passes on the rotation to a spindle nut 16 provided in the middle slide carriage 12.2, so that the rotation of the threaded spindle 15 is converted into a longitudinal movement of the middle slide carriage 12.2 along the guide rods 14.1 and 14.2. Due to the fact that the slide carriages 12.1 . . . 12.3 are mechanically coupled together by the guide link 17, ultimately through a longitudinal displacement of the middle slide carriage 12.2 along the guide rods 14.1 and 14.2 a longitudinal displacement of the two other side carriages 12.1 and 12.3 is also produced.

Figure 4A:
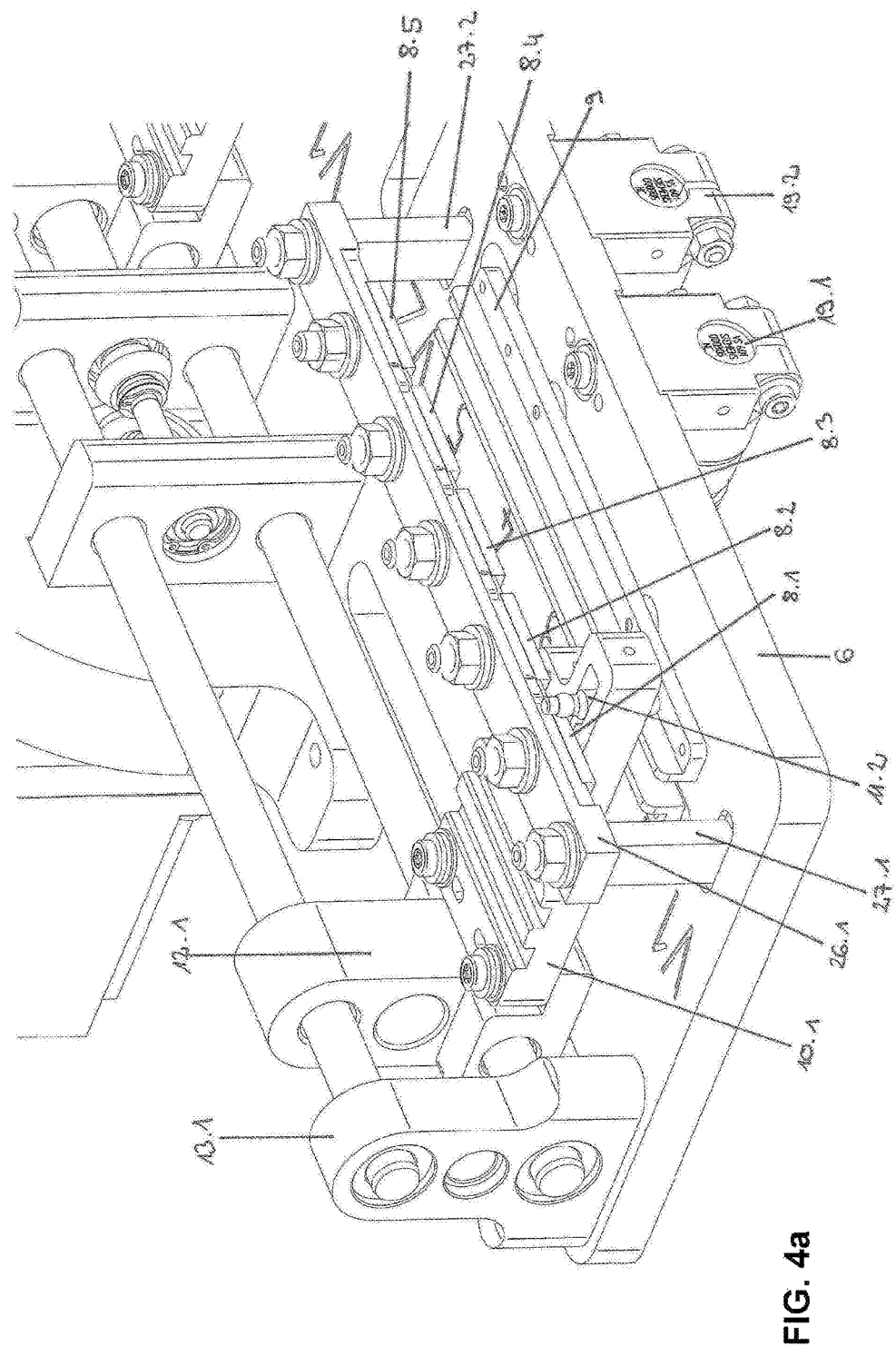
FIG. 4a shows a further detail view of the selector contact unit of an on-load tap changer according to the invention.

FIGS. 4a and 4b show, in two different perspectives, a further detail view of the selector contact unit 7.1 of a phase of the on-load tap changer 1 according to the invention and explain this by way of example; the selector contact units 7.2 and 7.3 are of identical construction. The following explanations therefore also apply to these selector contact units 7.2 and 7.3. The fixed selector contacts 8.1 . . . 8.5 are in that case arranged at a contact strip 25.1 of plastics material, for example by a screw connection as illustrated here. The contact strip 25.1 is fastened to the support plate 6 by two respective spacers 27.1 and 27.2, which are used as connection of a switch-over choke (not illustrated) or a switch-over resistance. Switch-over chokes are provided in accordance with the reactor switching principle and switch-over resistances according to the resistance fast switching principle. Moreover, the contact strip 25.1 has at the longitudinal side thereof a control link 26.1 at which several lobes 28.1 . . . 28.4 are arranged on both sides in order to vertically move the resiliently mounted selector contacts 11.1 and 11.2 of the corresponding selector contact unit 7.1 in the case of longitudinal displacement of the corresponding slide carriage 12.1, by the lobes 28.1 . . . 28.4 provided at the control link 26.1, in dependence on the profile of the plurality of lobes 28.1 . . . 28.4. The profile of the lobes 28.1 . . . 28.4 is in that case dimensioned so that the movable selector contacts 11.1, 11.2 of the selector contact unit 7.1 lift off the currently connected fixed selector contact, here 8.1, between two adjacent fixed selector contacts 8.1 . . . 8.5, since after switching-over is completed they connect again the next fixed selector contact, here 8.2. Whereas a middle setting of the movable selector contacts 11.1 and 11.2 at two adjacent fixed selector contacts 8.1 . . . 8.5 is permissible according to the reactor switching principle, according to the resistance fast switching principle there is onward switching to the next adjacent fixed selector contact. In order to achieve defined contact-making, the contact members 11.1 and 11.2 are formed to be spherical at the actual contact surface.

Figure 5:
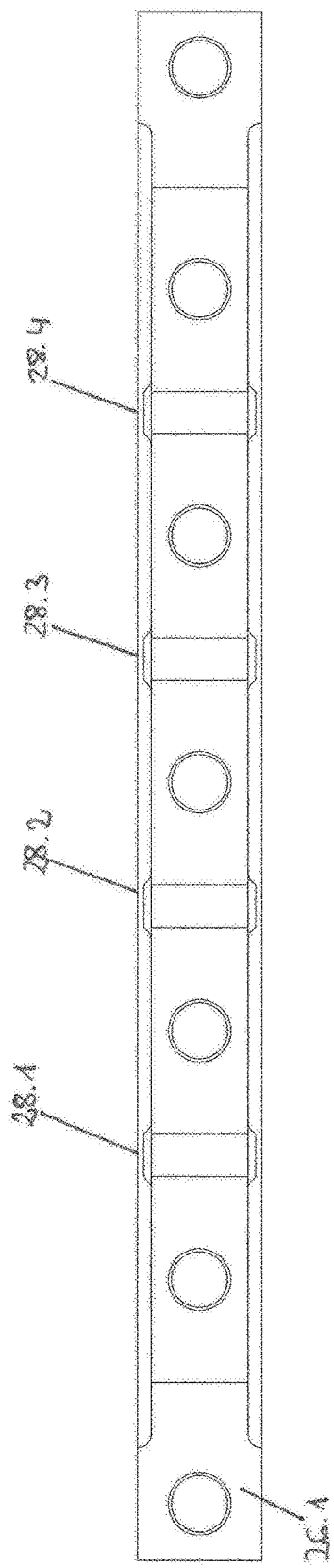
FIG. 5 shows a contact strip of an on-load tap changer according to the invention.

FIG. 5 shows the contact strip 25.1 . . . 25.3 with the control link 26.1 . . . 26.3 and the respective plurality of lobes 28.1 . . . 28.4 in a detail illustration, by means of which the corresponding movable selector contacts 11.1 and 11.2 or 11.3 and 11.4 or 11.5 and 11.6 of each selector contact unit 7.1 . . . 7.3 are vertically displaced during a switching-over process depending on the profiling of the lobes 28.1 . . . 28.4.

In the installed state of the on-load tap changer 1 according to the invention in a tapped transformer the movable switch contacts 20.1 . . . 20.6 of the vacuum interrupters 19.1 . . . 19.6 are electrically connected with the spacers 27.1 . . . 27.2 associated with the respective phase and thus ultimately with the corresponding switch-over chokes or switch-over resistances, whereas the corresponding fixed contacts 18.1 . . . 18.6 of the corresponding vacuum interrupters 19.1 . . . 19.6 are electrically connected with the contact rail 9 of the associated phase. However, in principle, it would also be conceivable to undertake the electrical connecting of the on-load tap changer 1 in a mode and manner exactly opposite to that just described.

Figure 6A:
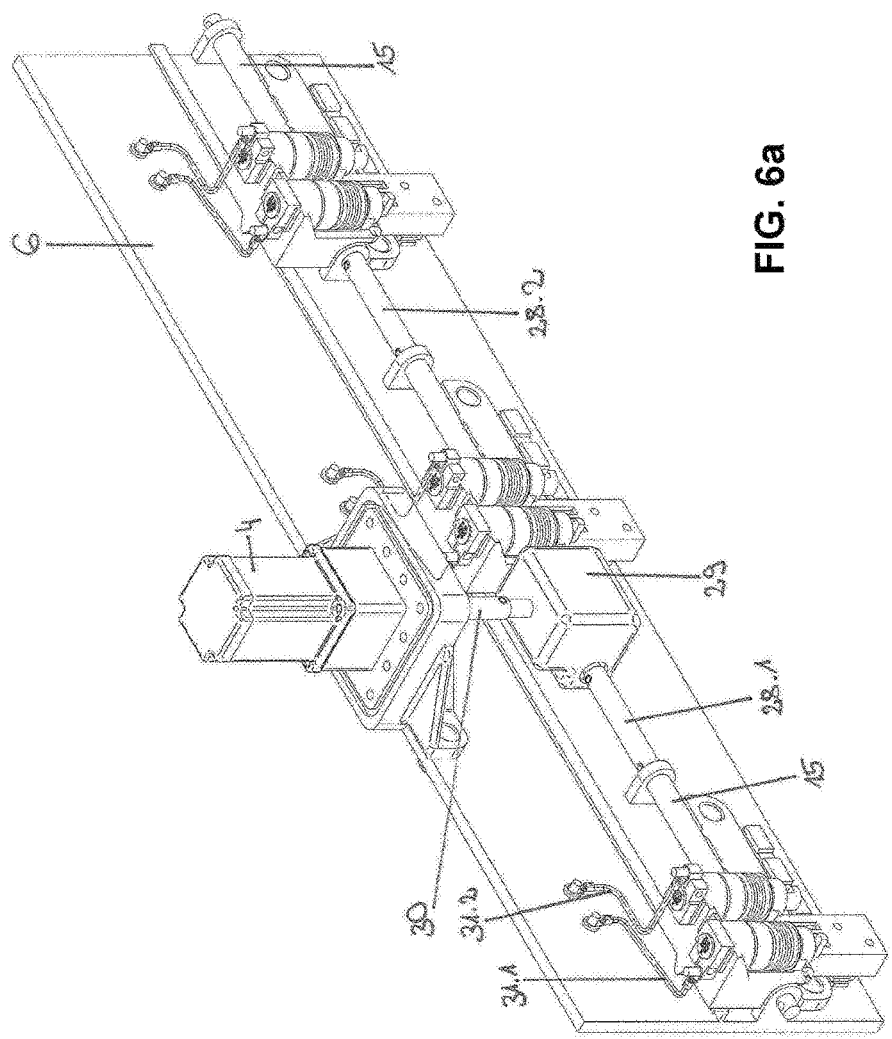
FIG. 6a shows a side perspective view of a further form of embodiment of an on-load tap changer according to the invention.

A further form of embodiment of an on-load tap changer 1 according to the invention is shown in FIGS. 6a and 6b. In the description of the figures, explanation is restricted to the differences from the preceding figures, wherein identical components are discussed with the same references numerals as in FIGS. 1 to 5. In this form of embodiment of the on-load tap changer 1 according to the invention the switching means for uninterrupted switching, thus the vacuum interrupters 19.1 . . . 19.6, are arranged directly at the corresponding slide carriage 12.1 . . . 12.3 of the respective selector contact unit 7.1 . . . 7.3 and constructed to be movable therewith along the threaded spindle 15. In this form of embodiment each selector contact unit 7.1 . . . 7.3 has its own spindle nut 16—not visible in this illustration— arranged in the corresponding slide carriage 12.1 . . . 12.3, so that the selector contact units 7.1 . . . 7.3 are thus constructed to be synchronously displaceable along the threaded spindle 15. The threaded spindle 15 is composed of a plurality of elements and has in each instance between the corresponding elements a coupling tube 28.1 . . . 28.2 formed from electrically insulating material. In addition, an angle transmission 29 is provided in order to pass on the rotation of the motor drive 3 to the threaded spindle 15. Arranged between the motor drive 3 and the angle transmission 29 is an insulating shaft 30 of dielectric material which introduces the rotation of the motor drive 3 into the angle transmission 29. The fixed contacts 18.1 . . . 18.6 of the vacuum interrupters 19.1 . . . 19.6 arranged at the corresponding slide carriage 12.1 . . . 12.3 are screw-connected with the support plate 6 by respective wires 31.1 . . . 31.6 and electrically connected with switch-over chokes or switch-over resistances (not illustrated). The movable switch contacts 20.1 . . . 20.6 of the vacuum interrupters 19.1 . . . 19.6 are in mechanically operative connection with a rocker arm arrangement 32.1 . . . 32.6 having a respective roller 33.1 . . . 33.6. In the installed state of the on-load tap changer 1 the movable switch contacts 20.1 . . . 20.6 of the vacuum interrupters 19.1 . . . 19.6 are electrically connected with the movable selector contacts 11.1 . . . 11.2 of the associated phase. The corresponding rollers 33.1 . . . 33.6 roll along the profiling of a guide rail 34.1 . . . 34.3 during longitudinal displacement of the slide carriage 12.1 . . . 12.3 so that the respective rocker arm arrangement 32.1 . . . 32.6 thereby connects, i.e. opens or closes, the corresponding movable switch contact 20.1 . . . 20.6 of the associated vacuum interrupter 19.1 . . . 19.6 in dependence on the profiling of the guide rail 34.1 . . . 34.3. The fixed selector contacts 8.1 . . . 8.5, of which only the fixed selector contacts 8.3 . . . 8.5 can be seen in this illustration, are here arranged directly on the support plate 6 and electrically connected on the opposite side (not illustrated here) of the support plate 6 with the corresponding winding taps of the regulating winding of the tapped transformer.

Figure 7A:
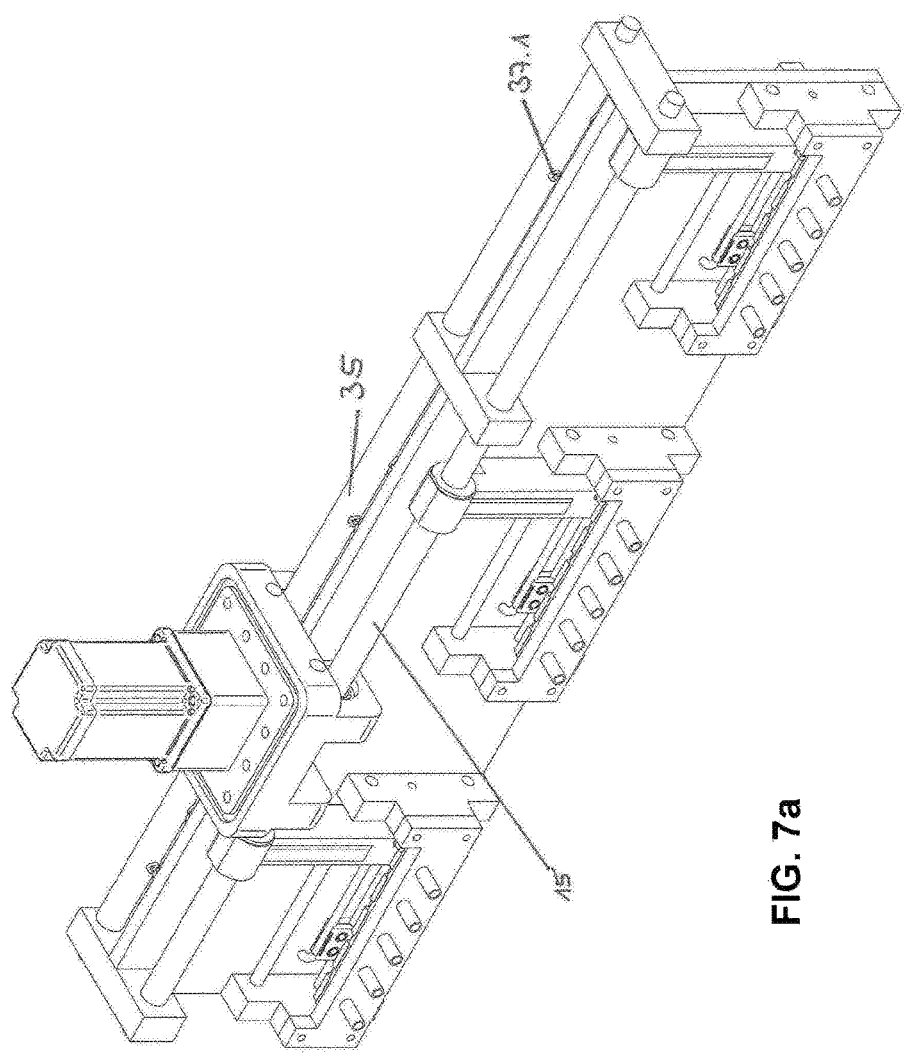
FIG. 7a shows a first side perspective view of yet a further form of embodiment of an on-load tap changer according to the invention.
Figure 7B:
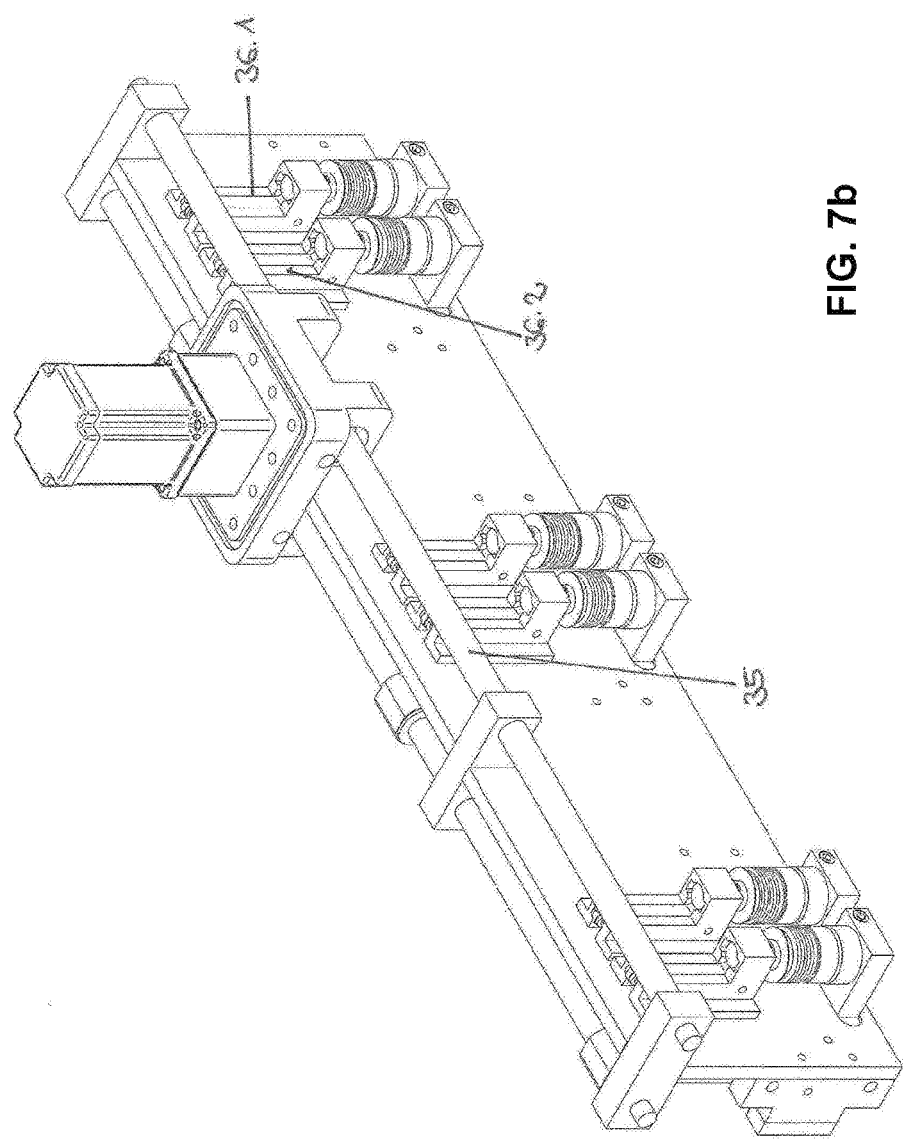

Yet a further form of embodiment of an on-load tap changer 1 according to the invention is shown in FIGS. 7a and 7b. In the case of the description of these figures, as well, explanation is restricted to the differences from the preceding figures, wherein identical components are discussed with the same reference numerals as in FIGS. 1 to 5. In the form of embodiment of FIGS. 7a and 7b there is driven by the motor drive 3 not only a threaded spindle 15, which is in turn in mechanically operative connection with each of the selector contact units 7.1 . . . 7.3, but also a camshaft 35, by way of which the switching means for uninterrupted switching, thus the vacuum interrupters 19.1 . . . 19.6, are actuatable. By contrast to the illustration of FIGS. 6a and 6b, the threaded spindle 15 is here constructed as a threaded spindle over its entire length and is in engagement with the spindle nut 16, which is provided in each of the slide carriages 12.1 . . . 12.3, in such a manner that each slide carriage 12.1 . . . 12.3 is horizontally moved when rotation of the threaded spindle 15 takes place. The other selector contact unit 7.1 . . . 7.3 is of identical construction to the selector contact unit 7.1 . . . 7.3 described in FIGS. 1 to 5. For actuation of the vacuum interrupters 19.1 . . . 19.6 each movable switch contact 20.1 . . . 20.6 is mechanically constrainedly coupled with a stroke rod 36.1 . . . 36.6, which so co-operates with cam lobes 37.1 . . . 37.6, which are opposite the movable switch contacts 20.1 . . . 20.6 and arranged on the camshaft 35, that when rotation of the camshaft 35 takes place the cam lobe 37.1 . . . 37.6 introduces a vertical movement into the corresponding stroke rod 36.1 . . . 36.6 and thus ultimately actuates the associated movable switch contact 20.1 . . . 20.6 of the corresponding vacuum interrupter 19.1 . . . 19.6. Depending on the switching sequence on which the on-load tap changer 1 is based a plurality of cam lobes 37.1 . . . 37.6 per vacuum interrupter 19.1 . . . 19.6 is in that case provided at the circumference of the camshaft 35.

In summary, it can be emphasized that the on-load tap changer 1 according to the invention is usable not only in accordance with the reactor switching principle, but also in accordance with the resistance fast switching principle. Depending on the underlying switch-over principle nine stationary operational settings are permissible with the, here, five illustrated fixed selector contacts 8.1 . . . 8.5 in accordance with the reactor switching principle, whereas merely five stationary operational settings are permissible with an on-load tap changer 1 according to the invention constructed in accordance with the resistance fast switching principle.

The on-load tap changer according to the invention can be used with particular advantage at distribution transformers for voltage regulation of local mains.

REFERENCE NUMERAL LIST 1 on-load tap changer
2 transformer cover
3 transmission module
4 motor drive
5 sealing module
6 support plate
7.1 . . . 7.3 selector contact unit
8.1 . . . 8.5 fixed selector contacts
9 contact rail
10.1 . . . 10.3 contact supports
11.1, 11.2 movable selector contacts
12.1 . . . 12.3 slide carriages
13.1 . . . 13.3 cross members
14.1, 14.2 guide rods
15 threaded spindle
16 spindle nut
17 guide link
18.1 . . . 18.6 fixed contacts
19.1 . . . 19.6 vacuum interrupters
20.1 . . . 20.6 movable switch contacts
21.1 . . . 21.6 coupling elements
22.1 . . . 22.6 control lever
23.1 . . . 23.6 rollers
24 upper-side guide link
25.1 . . . 25.3 contact strips
26.1 . . . 26.3 control links
27.1, 27.2 spacers
28.1, 28.2 coupling tubes
29 angle transmission
30 insulating shaft
31.1 . . . 31.6 wires
32.1 . . . 32.6 rocker arm arrangement
33.1 . . . 33.6 rollers
34.1 . . . 34.3 guide rails
35 camshaft
36.1 . . . 36.6 stroke rods
37.1 . . . 37.6 cam lobes

The invention claimed is:

1. An on-load tap changer for uninterrupted switching between different winding taps of a tapped transformer, wherein
at least one selector contact unit with a respective plurality of fixed selector contacts, which are respectively electrically connected with the individual winding taps, is arranged along a line,
the fixed selector contacts are actuatable by two longitudinally displaceable movable selector contacts,
wherein for the uninterrupted switching two vacuum interrupters are provided for each phase,
a motor drive for introducing a drive movement into the on-load tap changer is provided, and
the at least one selector contact unit and the switching means for the uninterrupted switching are so directly actuatable by the common motor drive that introduction of the drive movement of the motor drive into the at least one selector contact unit and the switching means for the uninterrupted switching takes place without interposition of a force-storing device.

2. The on-load tap changer according to claim 1, wherein rotation generated by the motor drive is transmissible by a transmission module to a threaded spindle engaged with a spindle nut provided at a center slide carriage so that a longitudinal displacement of the center slide carriage along guide rods can thereby be produced,
the remaining slide carriages are operatively connected with the center slide carriage by way of a similarly longitudinally displaceable guide link, which is mechanically coupled with the center slide carriage, so that the remaining slide carriages in turn are so mechanically coupled with the center slide carriage by way of the guide link that not only the selector contact units, but also the switching means for the uninterrupted load switching are thereby simultaneously actuatable.

3. The on-load tap changer according to claim 1, wherein the entire load changeover switch is arranged by a transmission module at the underside of a transformer cover.

4. The on-load tap changer according to claim 1, wherein the transmission module comprises a flange-like sealing module.

5. The on-load tap changer according to claim 1, wherein a support plate of a dielectric material, at the first side of which the at least one selector contact unit and at the second side of which switching means for the uninterrupted switching are arranged, is provided.

6. The on-load tap changer according to claim 1, wherein the at least one selector contact unit comprises a respective slide carriage, a respective contact support and respective movable selector contacts which co-operate with at least one fixed selector contact.

7. The on-load tap changer according to claim 1, wherein the slide carriage is received by two parallel arranged guide rods which are in turn arranged at the support plate by cross members.

8. The on-load tap changer according to claim 1, wherein the movable selector contacts are each received in a contact support and co-operate with fixed selector contacts arranged at the support plate.

9. The on-load tap changer according to claim 1, wherein the at least one selector contact unit is arranged to be so displaceable along the guide rods by the respective slide carriage that it is thereby possible to run through the regulating range of the on-load tap changer.

10. The on-load tap changer according to claim 1, wherein the plurality of cross-members forms a mechanical abutment for the at least one selector contact unit, which is displaceable along the guide rods, in such a way that the regulating range of the on-load tap changer is mechanically limited.

11. The on-load tap changer according to claim 1, wherein the movable selector contacts of a phase in each stationary operational setting connect at least one fixed selector contact of the same phase of the on-load tap changer.

12. The on-load tap changer according to claim 1, wherein in each instance two movable selector contacts are received in a contact support to be resiliently mounted.

13. The on-load tap changer according to claim 1, wherein the movable switch contact of the corresponding vacuum interrupter is respectively pivotably and mechanically operatively connected with a coupling element and a control lever, that provided at the pivotable connection between the corresponding support element and the control lever on the side facing the support plate is a roller which rolls along a profiled upper side of the guide link under partially maintained contact so that the respective vacuum interrupter is connectable by a longitudinal displacement of the guide link in dependence on the profiling of the upper side thereof.

14. The on-load tap changer according to claim 1, wherein the fixed selector contacts are arranged at a contact strip, which contact strips are in turn fastened to the support plate by respective spacers.

15. The on-load tap changer according to claim 1, wherein the contact strip has at its longitudinal side a control link at which several lobes are arranged on both sides.

16. The on-load tap changer according to claim 1, wherein the profile of the lobes is so dimensioned that the movable selector contacts of the corresponding selector contact unit between two adjacent fixed selector contacts lift off the currently connected fixed selector contact, since the movable selector contacts again connect the next fixed selector contact after switching has been completed.

17. The on-load tap changer according to claim 1, wherein
two respective vacuum interrupters per phase are directly arranged at the corresponding slide carriage of the respective selector contact unit,
the motor drive drives a central threaded spindle by an angle transmission,
each slide carriage has a separate spindle nut, and
the threaded spindle co-operates with the spindle nut of each slide carriage and the rotation can be converted into a synchronous longitudinal displacement of the plurality of slide carriages in such a manner that not only the movable selector contacts, but also the vacuum interrupters are thereby actuatable.

18. The on-load tap changer according to claim 1, wherein the motor drive drives not only a threaded spindle, which in turn is operatively connected with the selector contact unit but also a camshaft, by way of which the switching means for the uninterrupted switching are actuatable, in such a manner that both the movable switching contacts and the switching means for the uninterrupted switching are thereby actuatable.

19. The on-load tap changer according to claim 1 for use in voltage regulation of a distributing transformer.

* * * * *